(12) United States Patent
Nishida et al.

(10) Patent No.: US 8,298,108 B2
(45) Date of Patent: Oct. 30, 2012

(54) PLANETARY BEARING STRUCTURE

(75) Inventors: Hideaki Nishida, Tokyo (JP); Shuichi Isayama, Tokyo (JP)

(73) Assignee: Mitsubishi Heavy Industries, Ltd. (JP)

( * ) Notice: Subject to any disclaimer, the term of this patent is extended or adjusted under 35 U.S.C. 154(b) by 211 days.

(21) Appl. No.: 12/905,170

(22) Filed: Oct. 15, 2010

(65) Prior Publication Data

US 2011/0092330 A1     Apr. 21, 2011

(30) Foreign Application Priority Data

Oct. 16, 2009 (JP) ................................ 2009-239370

(51) Int. Cl.
*F16H 57/04* (2010.01)
(52) U.S. Cl. ...................................................... 475/159
(58) Field of Classification Search .................... 475/159
See application file for complete search history.

(56) References Cited

U.S. PATENT DOCUMENTS

| | | | | |
|---|---|---|---|---|
| 7,220,208 | B2 * | 5/2007 | Hedman ........................ | 475/159 |
| 2009/0247348 | A1 * | 10/2009 | Haupt et al. .................. | 475/159 |
| 2010/0144479 | A1 * | 6/2010 | Nakamura et al. ............ | 475/159 |

FOREIGN PATENT DOCUMENTS

| | | |
|---|---:|---|
| JP | 60-169462 U | 11/1985 |
| JP | 7-12068 A | 1/1995 |
| JP | 10-103344 A | 4/1998 |
| JP | 2000-337360 A | 12/2000 |
| JP | 2001-173647 A | 6/2001 |
| JP | 2005-9580 A | 1/2005 |

OTHER PUBLICATIONS

International Search Report and Written Opinion of Application No. PCT/JP2010/067466 mailed Nov. 9, 2010.

\* cited by examiner

*Primary Examiner* — Edwin A Young
(74) *Attorney, Agent, or Firm* — Lowe Hauptman Berner & Ham LLP

(57) ABSTRACT

In a planetary bearing structure equipped with a slide bearing mounted to a shaft hole of a planetary gear, the planetary gear rotating about the outer periphery of a planetary pin fixed to a carrier via the slide bearing, one or a plurality of oil supply grooves are formed in the outer peripheral surface of the planetary pin so as to extend in the axial direction. An oil supply port of a lubricant oil channel opens in the oil supply groove so as to forcedly supply lubricant oil. Furthermore, a discharge groove for trapping foreign matter, which is shallower than the oil supply groove, communicates from the oil supply groove to the wake flow side in the rotating direction of the planetary gear.

6 Claims, 9 Drawing Sheets

PLANETARY BEARING STRUCTURE

CROSS REFERENCE TO RELATED APPLICATIONS

This application claims benefit of Japanese Application No. 2009-239370 filed in Japan on Oct. 16, 2009, the content of which is hereby incorporated by its reference.

BACKGROUND OF THE INVENTION

1. Field of the Invention

The present invention relates to a planetary bearing structure applied to, for example, the gearbox of a wind power generator. 2. Description of Related Art A wind power generator is an apparatus that generates electricity with a generator that is driven in such a manner that a rotor head equipped with wind turbine blades rotates when receiving wind power and increases the rotational speed using a gearbox.

An example of the gearbox that increases the rotational speed of the rotor head is a planetary gear speed increasing mechanism. This planetary gear speed increasing mechanism is equipped with a plurality of planetary gears mounted to a carrier that rotates together with an input shaft and is configured such that these planetary gears engage with a sun gear that rotates together with an output shaft and internal gears fixed to the housing of the gearbox to revolve. In other words, the planetary gear speed increasing mechanism is an apparatus that increases the rotational speed of the carrier joined to the input shaft in accordance with the gear ratio set for the planetary gears, the sun gear, and the internal gears (the revolving speed of the planetary gears) and outputs the rotation from the output shaft joined to the sun gear.

The planetary gears of the planetary gear mechanism described above are each rotatably supported by the carrier via a planetary bearing. A rolling bearing or a slide bearing is generally used as the planetary bearing.

Between them, in a planetary bearing structure that employs the slide bearing, a slide bearing 50 is mounted to the inner peripheral surface of a planetary gear 40, for example, as shown in FIG. 11, and rotates about the outer periphery of a planetary pin 30 fixed to a carrier 21 side. At that time, the sliding surface between the slide bearing 50 and the planetary pin 30 generates pressure of lubricant oil in the bearing due to the rotation of the slide bearing 50 together with the planetary gear 40. This can therefore prevent the sliding surface of the slide bearing 50 from coming into contact with the planetary pin 30 owing to the pressure of the lubricant oil.

In the case where the slide bearing 50 is employed as the planetary bearing, a lubricating structure that reliably supplies lubricant oil to the sliding surface with a lubricant oil pump (not shown) or the like is employed because it is generally necessary to forcedly supply oil to the bearing portion.

With a planetary bearing structure shown in FIG. 11, a lubricant oil channel 60 extending from the carrier 21 and passing through the axial center of the planetary pin 30 is formed, as indicated by the broken line in the drawing, to supply lubricant oil to the sliding surface of the slide bearing 50 from an oil supply unit (not shown). This lubricant oil channel 60 has an oil supply port 61 in the radial direction formed in the planetary pin 30 to supply the lubricant oil to an oil supply groove 31 provided in the outer peripheral surface of the planetary pin 30. Reference sign 31a in the drawing denotes a chamfer formed at both axial ends of the oil supply groove 31.

A known slide bearing lubricating structure for forced lubrication is a technology for preventing wear and seizure of the bearing surface by checking the circulation of lubricant oil that has increased in temperature through the bearing to thereby prevent an increase in the temperature of the lubricant oil. In this technology, an oil supply groove that is axially elongated is formed in the arc-shaped surface of the bearing, and a brush seal that is axially elongated is fitted in the downstream edge of each bearing. (For example, refer to FIG. 1 of Japanese Unexamined Patent Application, Publication No. Hei 10-103344)

Furthermore, for a journal bearing, discharging solid foreign matter in a bearing main body to the outside of the bearing main body by positively using the flow of lubricant oil due to the rotation of a rotation shaft has been proposed (for example, refer to Japanese Unexamined Patent Application, Publication No. 2000-337360).

Meanwhile, in the case where the slide bearing 50 is used as the planetary bearing, when the rotational speed of the slide bearing 50 that rotates together with the planetary gear 40 becomes low, the planetary pin 30 inevitably comes into contact with the sliding surface of the slide bearing 50. Therefore, a soft alloy or plastic-based material is employed as a material for use in the sliding surface of the slide bearing 50.

However, since the sliding surface (bearing surface) and the planetary pin 30 inevitably come into contact with each other, friction occurs on the sliding surface of the slide bearing 50. As a result, wear debris of the sliding surface material is generated on the sliding surface of the slide bearing 50, which further accelerates wear by catching the wear debris unless the wear debris is smoothly discharged from the sliding surface of the slide bearing 50.

Since such accelerated wear finally causes damage to the slide bearing 50, it is desired to take measures to improve the durability and reliability of the planetary bearing.

The present invention is made in consideration of the above-described circumstances, and it is an object thereof to provide a planetary bearing in which a slide bearing is used as the bearing portion having a planetary bearing structure capable of smoothly discharging wear debris that is generated due to the contact between the bearing surface and the planetary gear together with lubricant oil from the sliding surface (bearing surface).

BRIEF SUMMARY OF THE INVENTION

To solve the problems described above, the present invention adopts the following solutions.

A planetary bearing structure according to the present invention is a planetary bearing structure equipped with a slide bearing mounted to the inner peripheral surface of a shaft hole of a planetary gear, the planetary gear rotating about the outer periphery of a planetary pin fixed to a carrier via the slide bearing, wherein the planetary bearing structure includes one or a plurality of oil supply grooves formed in the outer peripheral surface of the planetary pin so as to extend in the axial direction; a lubricating passage including a lubricant-oil supply outlet that opens in the oil supply groove so as to forcedly supply lubricant oil to the oil supply groove; and a discharge groove for trapping foreign matter, shallower than the oil supply groove and communicating from the oil supply groove to the wake flow side in the rotating direction of the planetary gear.

With such a planetary bearing structure, since one or the plurality of oil supply grooves extending in the axial direction are formed in the outer peripheral surface of the planetary pin, the lubricant-oil supply outlet of the lubricating passage for forcedly supplying lubricant oil opens in the oil supply groove, and since the foreign-matter trapping discharge groove shallower than the oil supply groove and communicating from the oil supply groove to the wake flow side in the rotating direction of the planetary gear is provided, a pressure flow flowing backward from the shallow discharge groove toward the oil supply groove is generated, thus allowing foreign matter to be trapped in the oil supply groove.

In the above invention, preferably, the discharge groove communicating from the oil supply groove to the wake flow side is provided at an inclination to at least one of the right and left sides with respect to the rotating direction. This allows the discharge groove inclined from the rotating direction to function as a spiral groove to generate a pressure flow flowing backward from the discharge groove in the direction of the oil supply groove, thus allowing foreign matter to be trapped in the oil supply groove.

In the above invention, preferably, the discharge groove communicating from the oil supply groove to the wake flow side is next to the oil supply groove in the circumferential direction. Since this causes a pressure flow flowing backward from the shallow discharge groove in the direction of the oil supply groove, foreign matter can be assuredly trapped in the oil supply groove disposed beside the discharge groove in the axial direction.

In the above invention, preferably, the discharge groove has a cross-sectional shape that forms a pressure flow for introducing foreign matter to the oil supply groove by generating a backflow in the lubricant oil. This causes a stronger pressure flow flowing backward from the discharge groove in the direction of the oil supply groove, thus ensuring that foreign matter is trapped in the oil supply groove.

According to the present invention described above, since a planetary bearing in which a slide bearing is used as a bearing portion is provided with a discharge groove for trapping foreign matter, which communicates from an oil supply groove to the wake flow side in the rotating direction of the planetary gear and which is shallower than the oil supply groove, a pressure flow flowing backward from the shallow discharge groove in the direction of the oil supply groove is generated, so that the foreign matter can be trapped in the oil supply groove due to the flow. Therefore, wear debris generated due to the contact between the sliding surface (bearing surface) of the slide bearing and a planetary pin can be smoothly discharged from the oil supply groove in the sliding surface together with the lubricant oil, thus preventing secondary damage to the bearing due to wear debris, and thus, a planetary bearing structure having excellent reliability and durability can be provided.

Application of this planetary bearing structure to the gearbox etc. of a wind power generator prevents or reduces damage to the slide bearing, thus improving the reliability and durability of the gearbox and the wind power generator.

DETAILED DESCRIPTION OF THE INVENTION

An embodiment of a planetary bearing structure according to the present invention will be described hereinbelow on the basis of the drawings.

<First Embodiment>

Figure 4:
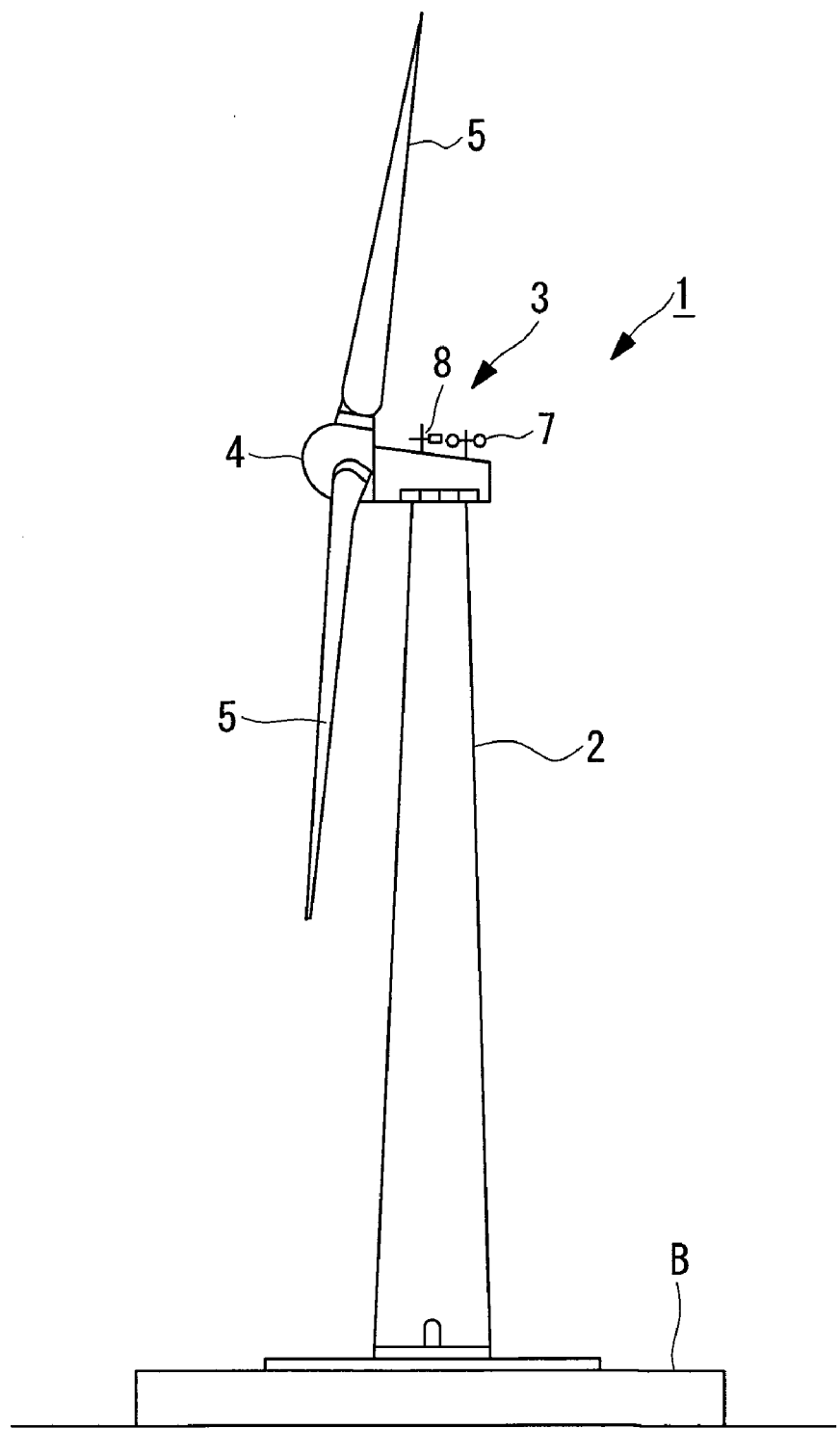
FIG. 4 is a side view illustrating a wind power generator in which the planetary bearing structure of the present invention is applied to the gearbox.

The planetary bearing structure according to the present invention is suitable for, for example, the gearbox of a wind power generator. A wind power generator 1 shown in FIG. 4 includes a tower (also referred to as "support pillar") 2, a nacelle 3 mounted on the upper end of the tower 2, and a rotor head 4 provided at the front end of the nacelle 3 so as to be rotatably supported about the substantially horizontal, lateral rotation axis thereof.

The rotor head 4 has a plurality of (for example, three) wind turbine blades 5 mounted in a radial pattern about the rotation axis. Thus, the force of wind blowing against the wind turbine blades 5 from the direction of the rotation axis of the rotor head 4 is converted to motive power that rotates the rotor head 4 about the rotation axis.

An anemometer 7 that measures the wind speed value in the vicinity and an anemoscope 8 that measures the wind direction are disposed at appropriate locations of the outer peripheral surface (for example, at the top etc.) of the nacelle 3.

Figure 5:
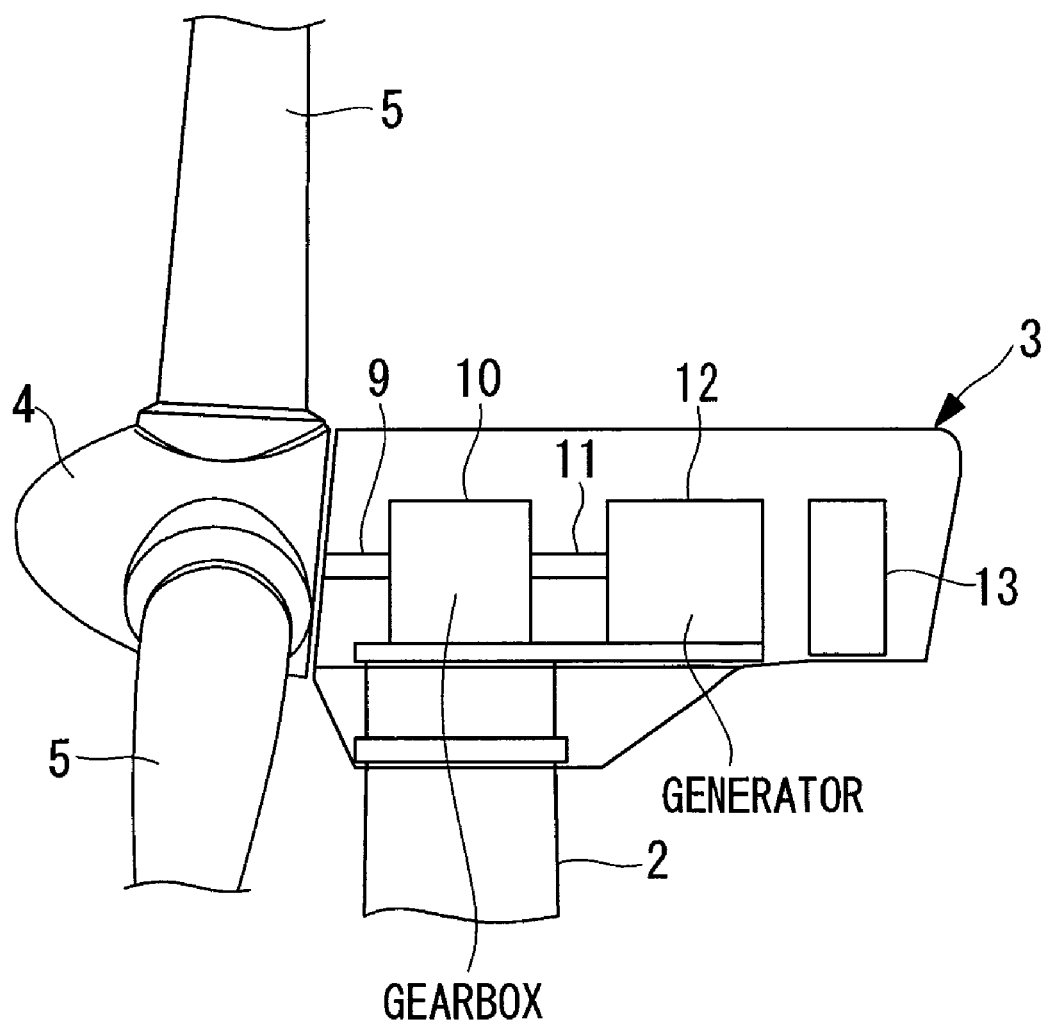
FIG. 5 is a sectional view of a relevant part of the wind power generator shown in FIG. 4, illustrating in outline a configuration example of the interior of a nacelle.

As shown in FIG. 5, for example, the nacelle 3 accommodates a gearbox 10 joined to the rotor head 4 via a main shaft 9 and a generator 12 joined to an output shaft 11 of the gearbox 10. That is, the rotational speed of the rotor head 4 is transferred to the gearbox 10 joined via the main shaft 9, and the gearbox 10 is driven at the increased rotation speed at the output-shaft side. The generator 12 is driven at the output-shaft side rotational speed increased via the gearbox 10, so that electric power generated by the generator 12 can be provided.

Furthermore, the nacelle 3 accommodates a wind-turbine control unit 13 that controls various operations of the wind power generator 1.

The gearbox 10 described above generally has a configuration in which a plurality of stages of gearbox mechanism are combined, in which the rotational speed of the main shaft 9 serving as an input shaft is increased to the final output rotational speed of the output shaft 11 through a plurality speedup stages.

Figure 2:
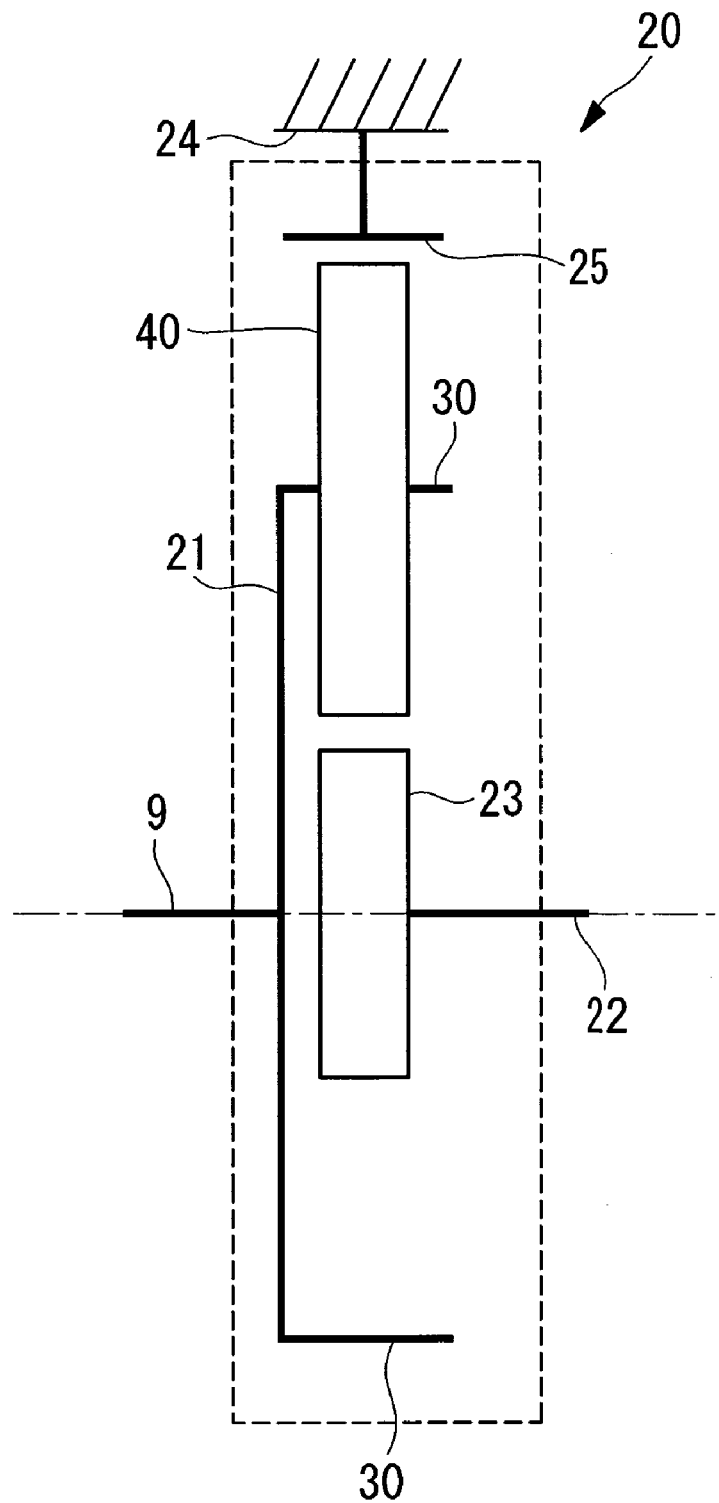
FIG. 2 is a diagram describing, in outline, the configuration of a planetary gearbox as an example of a planetary bearing train incorporating the planetary gear structure of the present invention.
Figure 3:
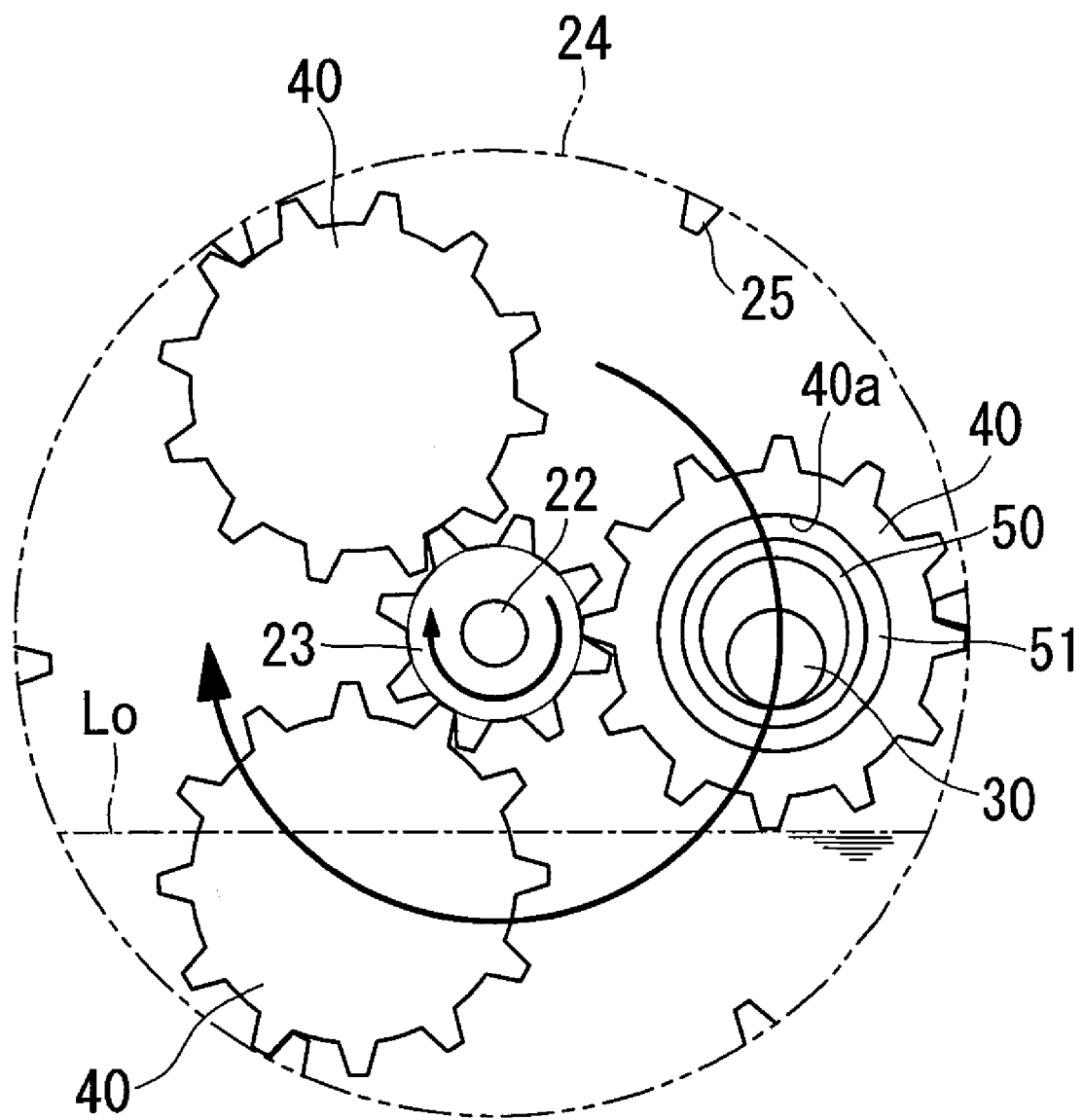
FIG. 3 is a schematic configuration diagram of the planetary gearbox shown in FIG. 2, as viewed from the axial direction.

FIGS. 2 and 3 show the outline of a planetary gear train (hereinafter referred to as "planetary gearbox") 20 that performs the first-stage speedup of the gearbox 10, described above, as an example of a planetary gear train incorporating the planetary bearing structure of the present invention. In the case where this planetary gearbox 20 is used as the gearbox of the wind power generator 1, the carrier 21 is joined to the main shaft 9 and is rotated therewith. In the illustrated configuration example, three planetary pins 30 are fixed to the carrier 21, and the planetary gears 40 are rotatably mounted to the individual planetary pins 30 via a slide bearing 50 and a bearing back metal of the slide bearing 50.

The relationship between the planetary pin 30 and the slide bearing 50 (the difference between the inside diameter and the outside diameter) is shown more exaggeratedly than the actual relationship for the convenience of illustration.

The planetary gearbox 20 is equipped with three planetary gears 40 mounted to the carrier 21 that rotates together with the main shaft 9 serving as the input shaft and is configured such that these planetary gears 40 revolve in engagement with the sun gear 23 that rotates together with an output shaft 22 and internal gears 25 fixed to a housing 24. That is, the planetary gearbox 20 is an apparatus that increases the rotational speed of the carrier 21 joined to the main shaft (input shaft) 9 (revolving speed of the planetary gears) in accordance with the gear ratio set for the planetary gears 40, the sun gear 23, and the internal gears 25, and the increased rotational speed is output from the output shaft 22 joined to the sun gear 23 to a two-stage speed increasing mechanism or the like (not shown).

Lubricant oil is stored up to, for example, a lubricant oil surface Lo shown in FIG. 3, in the housing 24 in which the planetary gears 40 revolve together with the carrier 21. It is desirable that this lubricant oil surface Lo have at least a depth to allow shaft holes 40a of the revolving planetary gears 40 to be dipped in the lubricant oil.

Figure 1A:
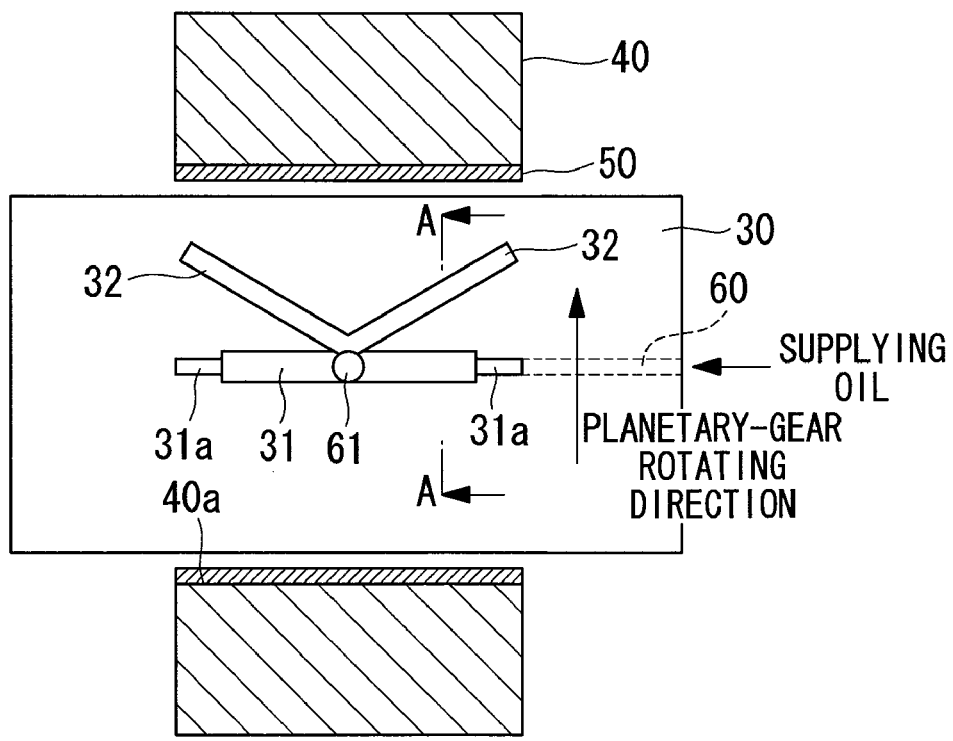
FIG. 1A is a cross-sectional view of a relevant part of a planetary bearing structure according to the present invention, illustrating the lubricating structure of a slide bearing in a first embodiment.
Figure 1B:
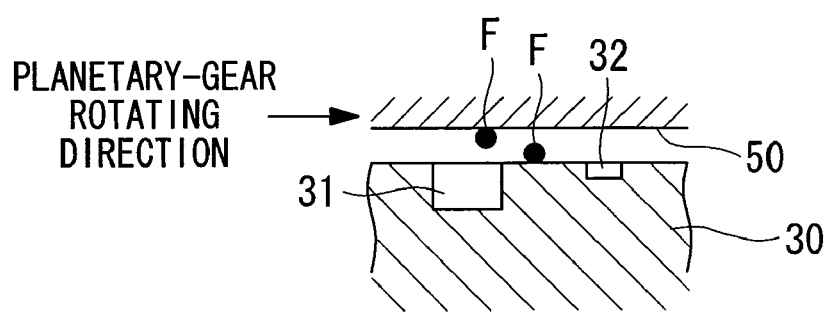
FIG. 1B is an enlarged cross-sectional view taken along line A-A in FIG. 1A.

The planetary gearbox 20 described above is equipped with a planetary bearing structure in which the planetary pin 30 rotatably supports the planetary gear 40, as shown in FIGS. 1A and 1B, for example. That is, the illustrated planetary bearing structure has the planetary pin 30 fixed to the carrier (not shown) and the planetary gear 40 in which the slide bearing 50 is mounted to the inner peripheral surface of the shaft hole 40a and is configured such that the planetary pin 30 rotatably supports the planetary gear 40 via the slide bearing 50. The slide bearing 50 in this case has a structure in which PEEK (polyether-ether-ketone) plastic is applied on the inner peripheral surface of a bearing back metal 51, for example.

Thus, the planetary bearing structure shown in FIGS. 1A and 1B is equipped with the slide bearing 50 mounted to the inner peripheral surface of the shaft hole 40a provided in the planetary gear 40 and is configured such that the planetary gear 40 rotates about the planetary pin 30 fixed to the carrier 21 via the slide bearing 50.

In the planetary bearing structure, an oil supply groove 31 extending in the axial direction is formed in the outer peripheral surface of the planetary pin 30. This oil supply groove 31 is provided at one or a plurality of locations (for example, two locations at 180° pitch or four locations at 90° pitch) in the circumferential direction of the planetary pin 30, whose groove depth is generally set at a few millimeters. Both axial ends of the oil supply groove 31 are each provided with a chamfer 31a that is gradually decreased in depth toward both axial ends.

The oil supply groove 31 described above is joined to an oil supply unit (not shown), such as a lubricant oil pump, via the lubricant oil channel 60. That is, the planetary bearing structure shown in FIGS. 1A and 1B is provided with a lubricating passage equipped with the lubricant oil channel 60 formed from the carrier 21 so as to pass through the axial center of the planetary pins 30 and a radial oil supply port (lubricant-oil supply outlet) 61, formed in the planetary pin 30 to perform forced lubrication involving supplying lubricant oil supplied from the oil supply unit to the sliding surface of the slide bearing 50 from the oil supply groove 31. The oil supply port 61 serving as the lubricant-oil supply outlet of the lubricating passage for forcedly supplying the lubricant oil opens in the oil supply groove 31 described above.

Furthermore, the outer peripheral surface of the planetary pin 30 is provided with a discharge groove 32 for trapping foreign matter, which is shallower than the oil supply groove. This discharge groove 32 is one or a plurality of grooves communicating from the oil supply groove 31 to the wake flow side in the rotating direction of the planetary gear 40 (refer to the arrow in the drawing) and has a cross-sectional shape, such as a rectangular cross section and a semicircular cross section, and a depth of about 100 μm.

In the illustrated configuration example, two discharge grooves 32 are provided, both of which are disposed such that the wake flow ends in the rotating direction are inclined toward both ends of the planetary pin 30 with respect to the rotating direction and so as to cover an axial area that is substantially equal to or longer than the length of the slide bearing 50.

Since the planetary bearing structure is configured such that one or a plurality of oil supply grooves 31 extending in the axial direction are formed in the outer peripheral surface of the planetary pin 30, the oil supply port 61 serving as the lubricant-oil supply outlet of the lubricating passage for forcedly supplying lubricant oil opens in this oil supply groove 31, and the foreign-matter trapping discharge groove 32 shallower than the oil supply groove 31 and communicating from the oil supply groove 31 to the wake flow side in the rotating direction of the planetary gear 40 is provided in this manner, a pressure flow flowing backward from the discharge groove 32 having a decreased depth toward the oil supply groove 31 is generated. In other words, since the lubricant oil pressure in the shallow discharge groove 32 becomes higher than that of the oil supply groove 31, the flow of lubricant oil from the high-pressure discharge groove 32 toward the low-pressure oil supply groove 31 is generated. As a result, foreign matter F present on the sliding surface of the slide bearing 50 is moved by being guided by the flow of the lubricant oil flowing from the discharge groove 32 toward the oil supply groove 31, thus allowing the foreign matter F on the sliding surface to be quickly trapped in the oil supply groove 31.

In this case, since the discharge groove 32 is formed with substantially the same width or more as that of the slide bearing 50, the foreign matter F present on the sliding surface can be assuredly taken in by the lubricant oil flowing backward toward the oil supply groove 31 when the slide bearing 50 rotates together with the planetary gear 40, thus allowing the foreign matter F present on the sliding surface to be assuredly trapped.

The foreign matter F trapped in the oil supply groove 31 is discharged outside the sliding surface through the forcedly lubricated circulation channel of the lubricant oil.

Preferably, the discharge groove 32 described above is inclined to at least one of the right and left sides with respect to the rotating direction. In other words, the discharge grooves 32 can be disposed so as to open from the vicinity of the center of the oil supply groove 31 to the right and left sidestoward the wake flow side in the rotating direction, as shown in FIG. 1A, and in contrast, so as to open from a wake flow side position in the vicinity of the center of the oil supply groove 31 to the right and left sidestoward the vicinity of both ends of the oil supply groove 31, or alternatively, so as to be inclined from the oil supply groove 31 to one of the right and left sides substantially in parallel.

Since the discharge grooves 32 inclined to the right and left sides with respect to the rotating direction function as spiral grooves because the slide bearing 50 rotates in this manner, the foreign matter F can be trapped in the oil supply groove 31 by generating a backward pressure flow from the discharge grooves 32 to the oil supply groove 31. In other words, since the discharge grooves 32 serving as spiral grooves further accelerate (apply pressure to) the pressure flow of the lubricant oil generated due to the difference in groove depth, described above, the foreign matter F can be assuredly trapped by generating a higher pressure flow.

The number of the discharge grooves 32 described above is not limited to two, shown in the drawing, but may be one or three or more.

Figure 8:
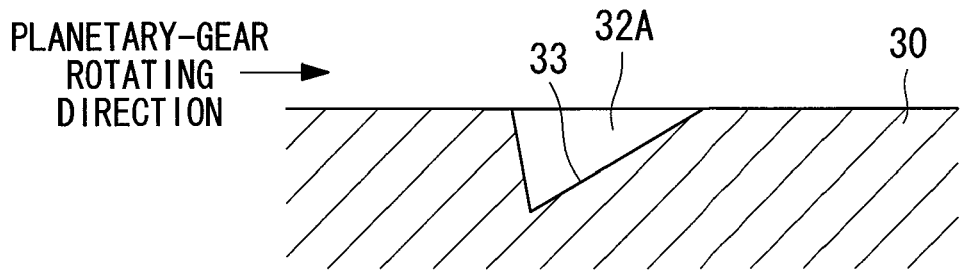
FIG. 8 is a cross-sectional view of a first modification of the cross-sectional shape of the discharge groove of the planetary bearing structure shown in FIGS. 1A and 1B.
Figure 9:
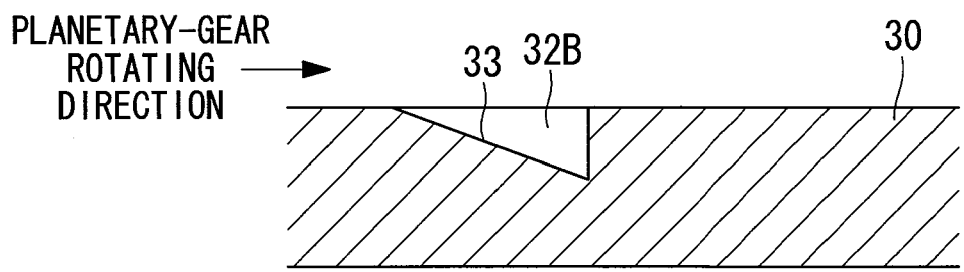
FIG. 9 is a cross-sectional view of a second modification of the cross-sectional shape of the discharge groove of the planetary bearing structure shown in FIGS. 1A and 1B.
Figure 10:
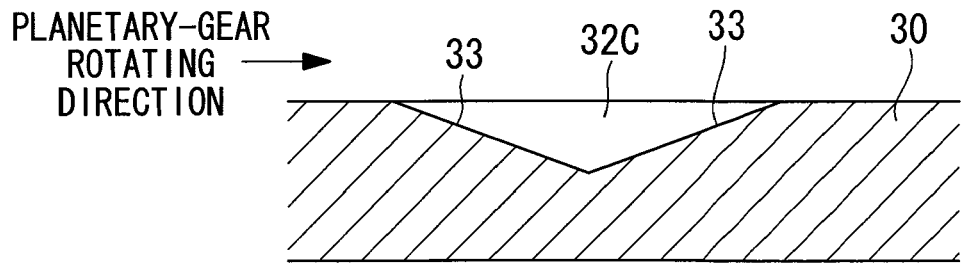
FIG. 10 is a cross-sectional view of a third modification of the cross-sectional shape of the discharge groove of the planetary bearing structure shown in FIGS. 1A and 1B.
Figure 11:
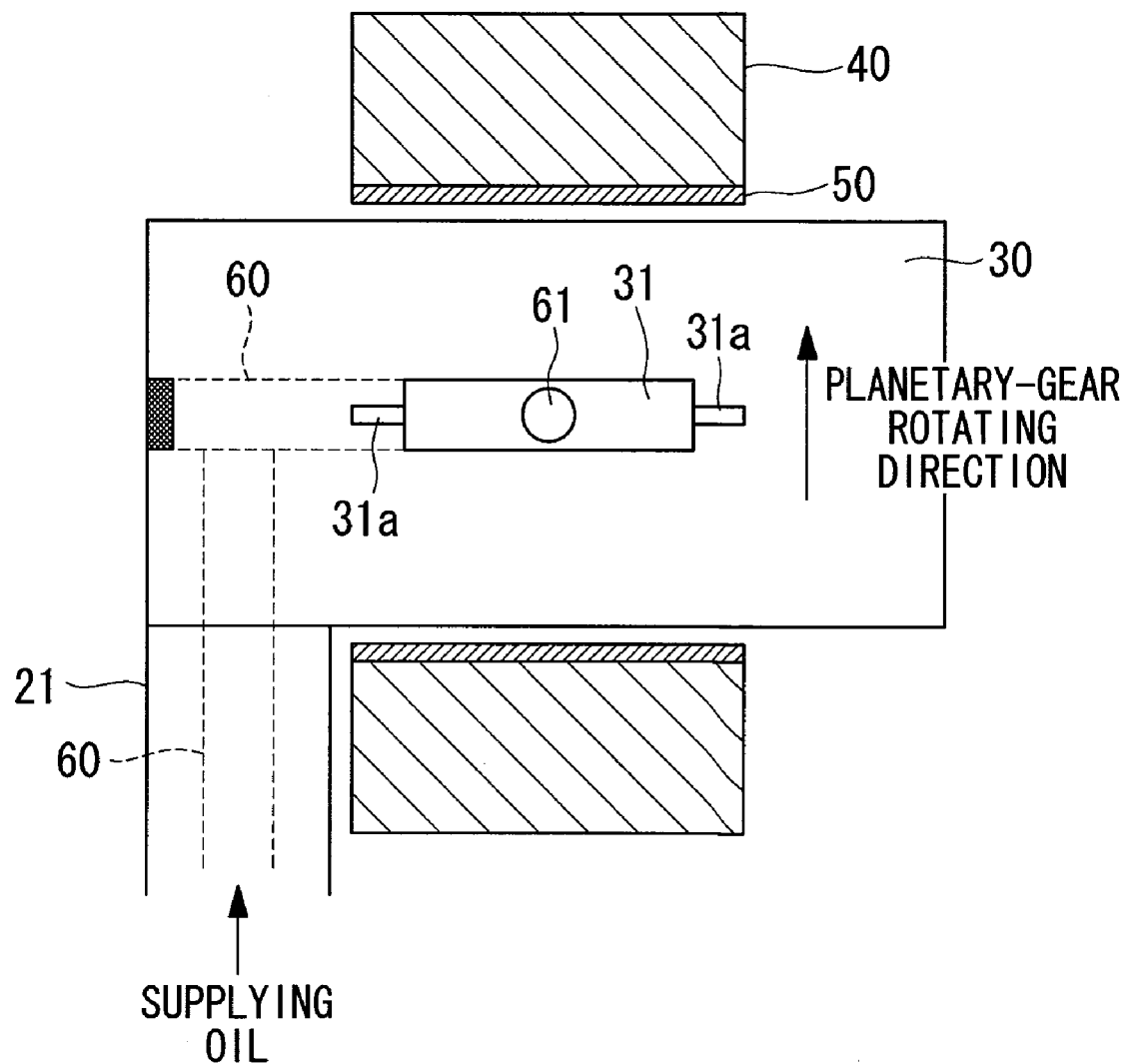
FIG. 11 is a cross-sectional view of a relevant part of a planetary bearing structure related to the present invention, in which a forced oil lubricating structure is illustrated.

Preferably, the discharge grooves 32 described above have a cross-sectional shape that forms a pressure flow for introducing the foreign matter F to the oil supply groove 31 by generating a back flow in the lubricant oil, for example, a cross-sectional shape in which an inclined surface (taper) can be formed by a triangular cross section or the like, as shown in FIGS. 8 to 10, for example. The groove depth in this case is 100 μm at the deepest portion, like the discharge grooves 32 described above.

A discharge groove 32A of a first modification, shown in FIG. 8, has a substantially right-angled triangular cross section in which the groove depth is gradually decreased in the rotating direction of the slide bearing 50 and the planetary gear 40, in which formation of a pressure flow that generates a back flow in the lubricant oil to guidethe foreign matter F to the oil supply groove 31 is further accelerated by the function of an inclined surface 33 formed in the discharge groove 32A. As a result, since a stronger pressure flow of the lubricant oil is formed owing to cooperation with the formation of the pressure flow by the spiral grooves described above, the foreign matter F can be trapped in the oil supply groove 31 more smoothly and assuredly.

A discharge groove 32B of a second modification, shown in FIG. 9, has a substantially right-angled triangular cross section opposite to the first modification, in which a back flow can be generated in the lubricant oil also by the inclined surface 33 formed in this discharge groove 32B, so that formation of a pressure flow that guidesthe foreign matter F to the oil supply groove 31 can be further accelerated.

A discharge groove 32C of a third modification, shown in FIG. 10, has a substantially isosceles triangular cross section in which the cross-sectional shapes of the first modification and the second modification are combined into one, in which a back flow can be generated also by the two inclined surfaces 33 formed in this discharge groove 32C, so that formation of a pressure flow that guidesthe foreign matter F to the oil supply groove 31 can be further accelerated.

<Second Embodiment>

Figure 6A:
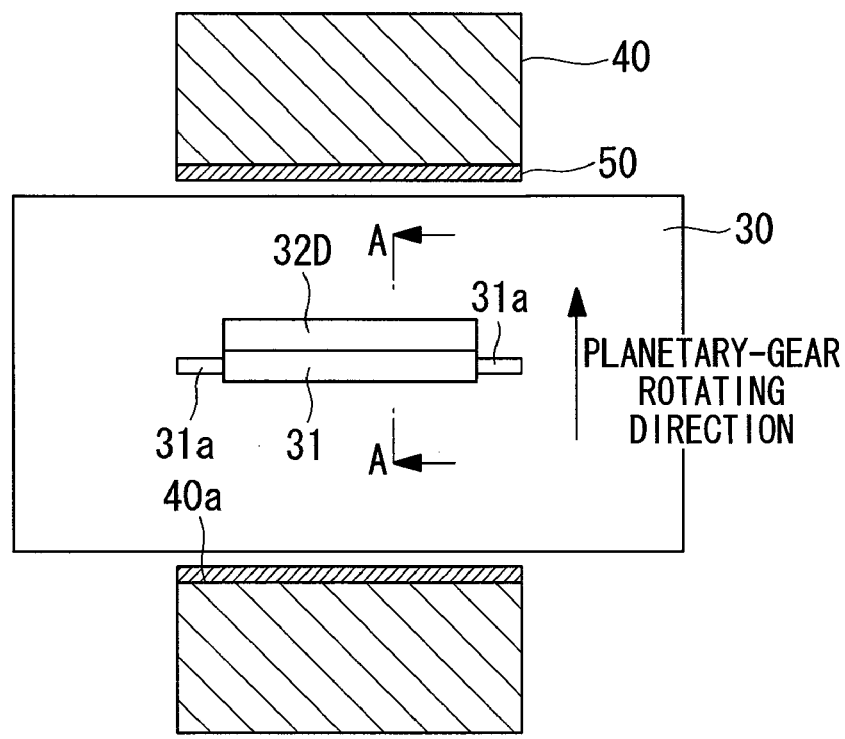
FIG. 6A is a cross-sectional view of a relevant part of a planetary bearing structure according to the present invention, illustrating the lubricating structure of a slide bearing in a second embodiment.
Figure 6B:
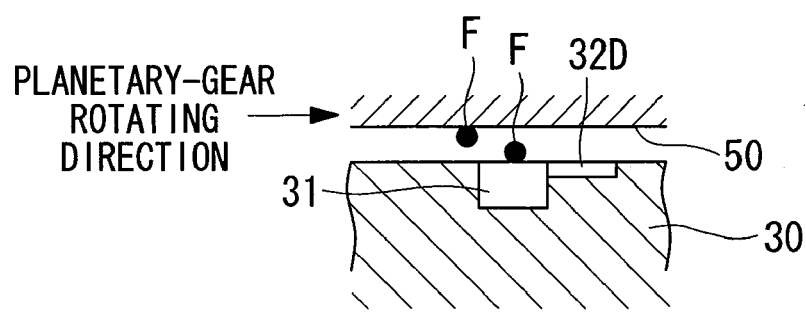
FIG. 6B is an enlarged cross-sectional view taken along line A-A in FIG. 6A.

Subsequently, regarding the planetary bearing structure according to the present invention, a second embodiment will be described on the basis of FIGS. 6A and 6B. In FIGS. 6A and 6B, the illustrations of the lubricant oil channel 60 and the oil supply port 61, described above, are omitted, and the same components as in the foregoing embodiment are given the same reference signs, and detailed descriptions thereof will be omitted.

In this embodiment, a discharge groove 32D communicating from the oil supply groove 31 to the wake flow side is located next to the oil supply groove 31 in the circumferential direction to form a level-difference portion. That is, one side of the oil supply groove 31 and one side of the discharge groove 32D (long sides extending in the axial direction) overlap with each other in plan view as seen from the outer periphery of the planetary pin 30 to form the level-difference portion at which the depth changes from the deep oil supply groove 31 at the upstream side in the rotating direction to the shallow discharge groove 32D at the wake flow side in the rotating direction. In the illustrated configuration example, although the cross-sectional shapes of the oil supply groove 31 and the discharge groove 32A are rectangular, the present invention is not limited thereto.

With such a configuration, since a pressure flow flowing backward from the shallow-depth discharge groove 32D at the high pressure side toward the deep-depth oil supply groove 31 at the low pressure side is generated, this lubricant oil flow guidesthe foreign matter F to the oil supply groove 31 disposed beside the discharge groove 32D in the axial direction to allow the foreign matter F to be assuredly trapped therein. The foreign matter F trapped in the oil supply groove 31 is discharged outside the sliding surface through the forcedly lubricated circulating channel of the lubricant oil.

Although the illustrated configuration example has one discharge groove 32D, a plurality of discharge grooves gradually decreased in depth may be provided side by side.

<Third Embodiment>

Figure 7A:
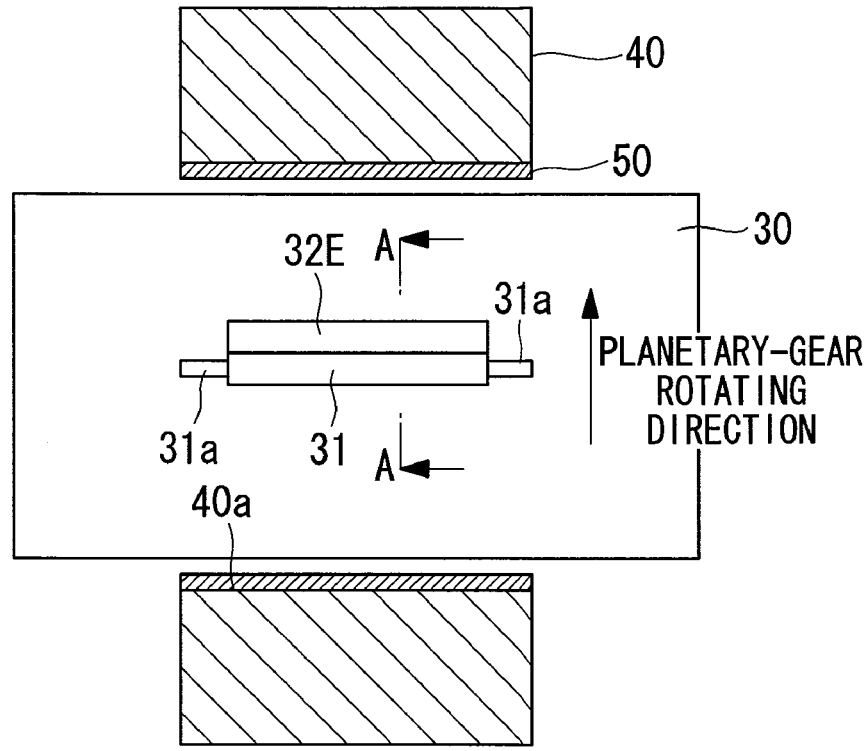
FIG. 7A is a cross-sectional view of a relevant part of a planetary bearing structure according to the present invention, illustrating the lubricating structure of a slide bearing in a third embodiment.
Figure 7B:
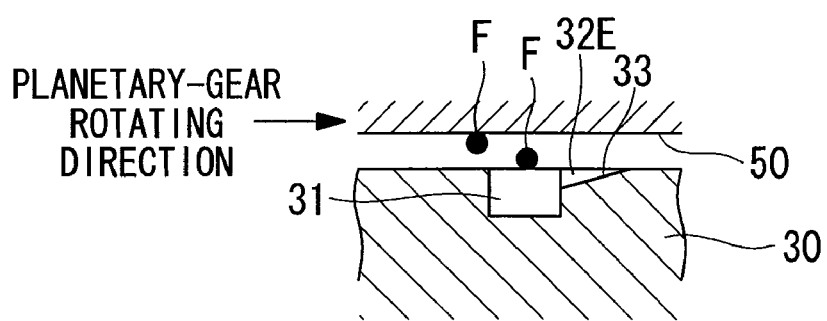
FIG. 7B is an enlarged cross-sectional view taken along line A-A in FIG. 7A.

Subsequently, for the planetary bearing structure according to the present invention, a third embodiment will be described on the basis of FIGS. 7A and 7B. In FIGS. 7A and 7B, the illustrations of the lubricant oil channel 60 and the oil supply port 61, described above, are omitted, and the same components as in the foregoing embodiments are given the same reference signs, and detailed descriptions thereof will be omitted.

A discharge groove 32E of this embodiment has a cross-sectional shape that generates a back flow in the lubricant oil to form a pressure flow for introducing foreign matter F to the oil supply groove 31, that is, a cross-sectional shape that accelerates the pressure flow, like an inclined surface 33 formed by a triangular cross section, for example. The inclined surface 33 in this case may be gradually decreased in groove depth toward the wake flow side in the rotating direction and is not limited to a straight line.

With such a configuration, since the discharge groove 32E that is gradually decreased in depth from the wake flow side in the rotating direction is provided, and the deep-depth oil supply groove 31 is present next to this discharge groove 32E, a stronger pressure flow of lubricant oil flowing backward from the discharge groove 32E toward the oil supply groove 31 is generated. Accordingly, the lubricant oil flow flowing from the high pressure side toward the low pressure side can guidethe foreign matter F to the oil supply groove 31 at the low pressure side disposed beside the high-pressure side discharge groove 32E in the axial direction, thus allowing the foreign matter F to be assuredly trapped therein.

The foreign matter F trapped in the oil supply groove 31 is discharged outside the sliding surface through the forcedly lubricated circulating channel of the lubricant oil.

Thus, according to the individual embodiments described above, since the planetary bearing in which the slide bearing 50 is used as the bearing portion is provided with the discharge groove 32 or 32A to 32E for trapping foreign matter, which communicates from the oil supply groove 31 to the wake flow side in the rotating direction of the planetary gear 40 and which is shallower than the oil supply groove 31, a pressure flow flowing backward from the shallow discharge groove 32 or 32A to 32E in the direction of the oil supply groove 31 is generated, so that the foreign matter can be trapped in the oil supply groove 31 due to the flow. Therefore, wear debris generated due to the contact between the sliding surface (bearing surface) of the slide bearing 50 and the planetary pin 30 can be smoothly discharged from the sliding surface (bearing surface) together with the lubricant oil, and thus, a planetary bearing structure having excellent reliability and durability can be provided.

Application of this planetary bearing structure to the gearbox 10 etc. of the wind power generator 1 prevents or reduces damages to the slide bearing 50, thus improving the reliability and durability of the gearbox and the wind power generator.

The present invention is not limited to the foregoing embodiments, and various modifications may be made without departing from the spirit thereof.

What is claimed is:

1. A planetary bearing structure equipped with a slide bearing mounted to the inner peripheral surface of a shaft hole of a planetary gear, the planetary gear rotating about a planetary pin fixed to a carrier via the slide bearing, the planetary bearing structure comprising:

one or a plurality of oil supply grooves formed in the outer peripheral surface of the planetary pin so as to extend in the axial direction;

a lubricating passage including a lubricant-oil supply outlet that opens in the oil supply groove so as to forcedly supply lubricant oil to the oil supply groove; and a discharge groove for trapping foreign matter, shallower than the oil supply groove and communicating from the oil supply groove to the wake flow side in the rotating direction of the planetary gear.

2. The planetary bearing structure according to claim 1, wherein the discharge groove communicating from the oil supply groove to the wake flow side is provided at an inclination to at least one of the right and left sides with respect to the rotating direction.

3. The planetary bearing structure according to claim 2, wherein the discharge groove has a cross-sectional shape that forms a pressure flow for introducing foreign matter to the oil supply groove by generating a backflow in the lubricant oil.

4. The planetary bearing structure according to claim 1, wherein the discharge groove communicating from the oil supply groove to the wake flow side is next to the oil supply groove in the circumferential direction.

5. The planetary bearing structure according to claim 4, wherein the discharge groove has a cross-sectional shape that forms a pressure flow for introducing foreign matter to the oil supply groove by generating a backflow in the lubricant oil.

6. The planetary bearing structure according to claim 1, wherein the discharge groove has a cross-sectional shape that forms a pressure flow for introducing foreign matter to the oil supply groove by generating a backflow in the lubricant oil.

* * * * *